(12) United States Patent
Fasano et al.

(10) Patent No.: US 8,470,910 B2
(45) Date of Patent: Jun. 25, 2013

(54) HIGH GLOSS EXTENDED ALKYD EMULSION PAINTS

(75) Inventors: David Michael Fasano, Maple Glen, PA (US); Alain Jean-Pierre Garzon, Peymeirade (FR); Melina Guy, Nice (FR)

(73) Assignee: Rohm and Haas Company, Philadelphia, PA (US)

( * ) Notice: Subject to any disclaimer, the term of this patent is extended or adjusted under 35 U.S.C. 154(b) by 638 days.

(21) Appl. No.: 12/655,138

(22) Filed: Dec. 23, 2009

(65) Prior Publication Data

US 2010/0166967 A1    Jul. 1, 2010

(30) Foreign Application Priority Data

Dec. 29, 2008  (EP) .................................. 08291253.6

(51) Int. Cl.
*C09D 5/00*      (2006.01)
(52) U.S. Cl.
USPC .......................... 523/218; 523/201; 427/385.5
(58) Field of Classification Search
USPC ................................................. 523/218, 201
See application file for complete search history.

(56) References Cited

U.S. PATENT DOCUMENTS

| 4,299,742 | A | * | 11/1981 | Belder et al. ................... 106/253 |
| 4,469,825 | A | * | 9/1984 | Kowalski et al. .............. 523/201 |
| 4,594,363 | A | | 6/1986 | Blankenship et al. |
| 5,698,625 | A | * | 12/1997 | Billiani et al. ................. 524/513 |
| 5,997,627 | A | * | 12/1999 | Babler ........................... 106/493 |
| 6,262,149 | B1 | * | 7/2001 | Clark et al. .................... 523/501 |

FOREIGN PATENT DOCUMENTS

| EP | 0 113 435 A2 | 7/1984 |
| EP | 0 700 976 | 3/1996 |
| JP | 61246264 | 11/1986 |
| JP | 2857878 | 2/1999 |
| WO | WO 0210297 A2 * | 2/2002 |

* cited by examiner

*Primary Examiner* — Vickey Nerangis
(74) *Attorney, Agent, or Firm* — Cantor Colburn LLP; Karl E. Stauss

(57) ABSTRACT

This invention is an aqueous paint composition comprising an alkyd emulsion; a dispersion of organic extender particles, which particles comprise, when dry, one or more void; and one or more pigment. The aqueous paint composition provides high gloss decorative and protective coatings for various substrates, which coatings are extended with lower cost-in-use opaque polymer while still providing the high gloss performance of unextended alkyd emulsion paints. Also provided is a method for providing the high gloss coating.

13 Claims, No Drawings

HIGH GLOSS EXTENDED ALKYD EMULSION PAINTS

This patent application claims the benefit of the earlier filed European Patent application serial number 08291253.6 filed on Dec. 30, 2008 under 37 CFR 1.55(a).

This invention relates to aqueous alkyd emulsion paints. This invention particularly relates to the use of opaque polymer as an organic extender in high gloss alkyd emulsion based paints. More particularly, this invention relates to an aqueous paint composition comprising an alkyd emulsion; a dispersion of organic extender particles, which particles comprise, when dry, one or more void; and one or more pigment.

As used herein, the term "pigment" includes opacifying pigments, colorants, and special effects pigments.

As used herein, the term "opacifying pigment" specifically excludes the organic extender particles, which particles comprise, when dry, one or more void. That is, as used herein, the term "opacifying pigment" excludes opaque polymer. Opacifying pigment herein encompasses inorganic pigment particles that scatter essentially all wavelengths of visible light without a high degree of absorption, such as, for example, titanium dioxide.

As used herein, the term "colorant" encompasses inorganic and organic colorants and includes both color imparting pigments and dyes.

Special effects pigments include metal effect pigments, transparent effect pigments, thermochromic pigments, photochromic pigments, and luminescent pigments such as fluorescent pigments and phosphorescent pigments.

As used herein, the term "polymer" includes the term "copolymer", and, unless otherwise indicated, the term "copolymer" refers to polymers made from any two or more different monomers, e.g. terpolymers, pentapolymers, etc., and polymers (homopolymers and copolymers) functionalized after polymerization so that two or more different functional groups are present in the product copolymer.

As used herein, for statements directed to "acrylics" or "styrene-acrylics", etc. as a class of polymers, it is understood to include polymers with methacrylic acid and/or methacrylate monomers as well as acrylic acid and/or acrylate monomers.

As used herein, unless otherwise indicated, the term "emulsion polymer" refers to a polymer made by emulsion polymerization. The term "alkyd emulsion" refers to a dispersion of an alkyd in water regardless of the technique used to manufacture the alkyd polymer, such as, for example, solution polymerization in solvent.

Unless otherwise indicated, conditions of temperature and pressure are room temperature and standard pressure.

Unless otherwise indicated, any term containing parentheses refers, alternatively, to the whole term as if no parentheses were present and the term without that contained in the parentheses, and combinations of each alternative. Thus, the term "(meth)acrylate" means acrylate, methacrylate, or mixtures thereof, and, similarly, the term "(meth)acrylic" refers to any of acrylic, methacrylic, and mixtures thereof.

As used herein, the term "naturally derived plasticizer" refers to animal-derived oil, fish-derived oil, plant-derived oil, alkyl esters thereof, glycerides thereof, and mixtures thereof.

The singular forms "a," "an," and "the" include plural referents unless the context clearly dictates otherwise. The endpoints of all ranges directed to the same component or property are inclusive of the endpoint and independently combinable.

The present invention serves to provide an aqueous polymeric composition that is particularly suitable for use in high gloss decorative and protective coatings for various substrates, which coatings are extended with lower cost-in-use opaque polymer while still providing the high gloss performance of unextended alkyd emulsion paints.

Alkyd paints have long been in use due to the relatively inexpensive starting materials used in their manufacture and a useful balance of coating properties, including high gloss and good adhesion to substrates. Traditionally, the alkyd resin was manufactured and supplied in solvent, and so these were solventborne paints. Environmental and safety concerns have resulted in regulatory measures to limit volatile organic compounds (VOC's), which in turn has favored waterborne paints over solventborne paints. For the most part, waterborne paints from techniques such as emulsion polymerization have proved to be suitable in most end-use applications, although alkyd resins have not been eliminated entirely and techniques have been developed to supply the latter in water as alkyd emulsions, see, for example, U.S. Pat. No. 3,269,967 (to Broadhead).

In the field of waterborne paints, techniques have been developed to provide a hollow sphere polymer, or "opaque polymer", which has been successfully used to replace expensive titanium dioxide (TiO2) pigment in the paint while still providing the desired opacity, or "hiding", of the TiO2 pigment. Although mineral extenders, such as calcium carbonate, silica, talc, mica, barites, clay, and others, are also commonly used as cheaper fillers, none are able to provide the opacity required to replace the most expensive component in the paint (TiO2). Unfortunately, it is well known in the art that neither mineral extenders nor opaque polymer can be used to replace TiO2 in high gloss waterborne acrylic paint systems and still retain the high gloss. Generally speaking, addition of approximately 5% opaque polymer results in greater than 20% reduction in the 20° specular gloss for waterborne acrylic paints. Therefore, opaque polymer has not found utility in high gloss waterborne paints.

Japanese Patent Application Number JP61246264A describes a water-based paint composition comprising a maleinized alkyd resin emulsion that has excellent covering power ("hiding") without containing pigments such as titanium white (TiO2). This Japanese application describes the use of opaque polymer to give "hiding" in an alkyd emulsion system. However, what is needed is a high gloss alkyd emulsion paint that utilizes a readily available extender or synthetic pigment as a replacement pigment for TiO2 while retaining both the opacity and the high gloss characteristics of the paint.

This invention provides an aqueous composition that utilizes opaque polymer as a replacement pigment for TiO2 and functions as a high gloss alkyd emulsion paint while retaining both the opacity and the high gloss characteristics of the paint. Regular extenders are unable to fulfill this role.

A first aspect of the present invention provides aqueous paint compositions comprising one or more alkyd emulsion; a dispersion of organic extender particles, which particles comprise, when dry, one or more void; and one or more pigment; wherein the amount of organic extender particles in the composition is less than 10 parts by dry weight of organic extender particles to 100 parts by dry weight of the alkyd emulsion. In one embodiment, the pigment comprises one or more opacifying pigment or colorant. Preferably, the pigment comprises titanium dioxide.

In another embodiment of the invention, the pigment particles of the aqueous paint composition are present in an amount of less than 140 parts by dry weight of pigment particles to 100 parts by dry weight of the alkyd emulsion. Preferably, the pigment particles are present in an amount of less than 110 parts, more preferably less than 100 parts, by dry weight of pigment particles to 100 parts by dry weight of the alkyd emulsion. Preferably, the aqueous paint composition comprises no more than 10 parts, or no more than 5 parts, or, more preferably, no more than 3 parts, by dry weight of mineral extender to 100 parts by dry weight of the alkyd emulsion.

Yet another embodiment of the invention provides aqueous paint compositions which, upon evaporation of the aqueous phase and after 7 days drying at 25° C. and 50% relative humidity, produce a coating on a glass substrate, which coating exhibits a 20° specular gloss of greater than 75%, preferably greater than 80%.

In still another embodiment of the invention, the alkyd emulsion of the aqueous paint composition comprises a vinyl-alkyd.

In a further embodiment of the invention, the alkyd emulsion of the aqueous paint composition comprises an acrylic-alkyd or styrene-acrylic alkyd.

In yet still another embodiment of the invention, the aqueous paint composition further comprises a waterborne polymer dispersion wherein the polymer is chosen from: an acrylic polymer, a styrene-acrylic polymer, a vinylacetate polymer, a vinylacetate-acrylic, an ethylene-vinylacetate, an ethylene-vinylacetate-vinylchloride, a polyurethane, and a polyamide.

Another aspect of the invention provides a method for providing a high gloss paint comprising: (a) forming the aqueous paint composition of the above invention; (b) applying the aqueous paint composition to a substrate; and (c) drying, or allowing to dry, the applied aqueous paint composition.

The compositions of the present invention provide new routes to high gloss waterborne alkyd emulsion paints. These compositions comprise an alkyd emulsion, a dispersion of organic extender particles which contain one or more void when dry, and one or more pigment.

Alkyds are ester-based polymers derived from the polycondensation reaction of a polyhydric alcohol and a polybasic acid (or anhydride) with either the starting reagents or resulting backbone modified with an oil or unsaturated fatty acid. In either case, the resulting product is essentially a polyester resin to which pendant drying oil groups are attached. The latter provide crosslinking sites for autoxidation reactions with oxygen from the air after the film has been applied, and this reaction is often catalyzed by the addition of organic salts of multivalent metals (or "driers") in the paint, such as cobalt naphthenate, and manganese tallate. A commercial example of an appropriate drier is Additol™ VXW4940, manufactured by Cytec. Methods of manufacturing alkyd resins are well known in the art and such products are readily available commercially, for example, as provided by DSM (Royal DSM N.V., Heerlen, the Netherlands) under the "Uralac" trade name, for example Uralac® AD132.

Polyhydric alcohols which have been used in the preparation of alkyds include any that contain at least two hydroxyl groups, such as glycerol, trimethylol propane, pentaerythritol, sorbitol, mannitol, and diols such as ethylene glycol and propylene glycol. Representative polybasic acids include benzene polycarboxylic acids and their anhydrides, for example, phthalic acid and phthalic anhydride, or trimellitic acid and trimellitic anhydride. Unsaturated fatty acids that find use in the manufacture of alkyds include the fatty oils. Useful fatty acids include those that contain at least two olefinic bonds and at least about 10 carbon atoms, with 16-24 carbon atoms being particularly suitable, such as linoleic, eleostearic and arachidonic. Economical sources of acids are the natural mixtures of acids obtained from drying (fatty) oils such as linseed oil, soya oil, tung oil, etc. Also, any of the drying oils containing fatty acid esters, whether of vegetable or marine life origin, have found use, including linseed oil, soybean oil, tung oil, castor oil, safflower oil, and sardine oil.

Some manufacturers have sought a property balance intermediate between those of alkyds and those of other known vinyl polymers, and generally this has been achieved by vinyl modification of the alkyd to give such vinylated alkyds as styrenated alkyds, vinyl-toluenated alkyds, and acrylic-modified alkyds. Although none of the high molecular weight homopolymers of these vinyl-type monomers has good compatibility with alkyds, and the lower molecular weight polymers that are more compatible show less value because of their reduced physical properties, useful vinylated alkyds can be produced by copolymerizing the vinyl monomers into the alkyd manufacture.

The desire to reduce the level of solvent released by these alkyd and vinylated alkyd resins when used in coatings has led to the development of waterborne alkyds or "alkyd emulsions", which still enjoy a continued and growing use. Methods of their manufacture are also well-known in the art; see, for example, U.S. Pat. No. 3,269,967 (to Broadhead), and they are also readily available commercially, for example as provided by DSM (Royal DSM N.V., Heerlen, the Netherlands) under the Uradil trade name, for example Uradil® AZ 554 Z-50.

In the context of waterborne binders for such purposes as waterborne paints and coatings, an alternative to vinyl modification of the alkyd during manufacture is to simply blend an alkyd emulsion with another polymer emulsion, which latter may, or may not be, an emulsion polymer (i.e. a polymer made by emulsion polymerization). This is readily accomplished since both are presented as dispersions of polymer in water, and a wide variety of base polymers exists both for emulsion polymers and for alkyds in alkyd emulsions. In particular, blends of one or more alkyd emulsion with one or more acrylic emulsion or styrene-acrylic emulsion, or combinations thereof, have gained widespread use. Emulsion polymers are made by emulsion polymerization, which is discussed in detail in D. C. Blackley, *Emulsion Polymerization* (Wiley, 1975), or, alternatively, it is also discussed in H. Warson, *The Applications of Synthetic Resin Emulsions*, Chapter 2 (Ernest Benn Ltd., London 1972). Emulsion polymers may be obtained commercially, such as, for example, polymers available under the tradename Rhoplex™ or Primal™ from the Rohm and Haas Company (Philadelphia, Pa., USA). Although emulsion polymers are the mostly widely used waterborne polymers, other dispersions of polymers in water may also be suitable for the purpose of blending with alkyd emulsions. Such dispersions may include polyurethane dispersions (PUD), an acrylic polymer, a styrene-acrylic polymer, a vinylacetate polymer, a vinylacetate-acrylic, an ethylene-vinylacetate, an ethylene-vinylacetate-vinylchloride, a polyurethane, and a polyamide, and other terpolymer dispersions, etc.

The inventive composition comprises a dispersion of organic extender particles, which particles comprise, when dry, one or more void. Such voided particles are often referred to in the art as "opaque polymer". Most commonly, these are made by an emulsion polymerization process, as discussed in Blackley or Warson (see above). More specifically, opaque polymer is most commonly formed via an aqueous multistage emulsion polymerization to form a core-shell polymeric particle.

The core of the core-shell polymeric particle includes, when dry, a core having at least one void capable of scattering visible light, i.e., capable of providing opacity to a composition in which it is included. Core-shell particles including, when dry, one or more void have been disclosed in which the void was generated, for example, by complete or partial hydrolysis and dissolution of the core polymer, by swelling of the core polymer with acid, base or nonionic organic agents with restricted subsequent collapse of the particle, and the like. Most commonly, the core-shell particle is formed by an aqueous multistage emulsion polymerization followed by swelling with a base. Such multistage processes are disclosed in U.S. Pat. Nos. 4,427,836; 4,468,498; 4,469,825; 4,594,363; 4,677,003; 4,910,229; 4,920,160; 4,970,241; 5,157,084; 5,494,971; 5,510,422; 6,139,961; 6,632,531; and 6,896,905; as well as in European Patent Applications EP 267,726, EP 331,421 and EP 915,108.

The stages of the preferred multistage polymers of the present invention include core stage polymer (the "core"), and shell stage polymer (the "shell"). The core and shell may each, independently, include more than one stage. There may also be one or more intermediate stages. An intermediate stage polymer, when present, partially or fully encapsulates the core and itself is partially or fully encapsulated by the shell. The intermediate stage may be prepared by conducting an emulsion polymerization in the presence of the core.

The cores of the preferred multistage polymers are emulsion polymers and include, as polymerized units, from 5% to 100%, preferably from 20% to 60%, and more preferably from 30% to 50% by weight, based on the weight of the core, of at least one hydrophilic monoethylenically unsaturated monomer and from 0 to 95 percent by weight, based on the weight of the core stage polymer, of at least one nonionic monoethylenically unsaturated monomer. Cores containing at least five percent by weight, based on the total weight of the core polymer, of at least one hydrophilic monoethylenically unsaturated monomer will generally result in a suitable degree of swelling. The core polymer may be made in a single stage or step of the multistage polymerization or may be made by a plurality of steps in sequence.

Suitable hydrophilic monoethylenically unsaturated monomer useful for making the core polymer include monoethylenically unsaturated monomers containing acid-functionality such as monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. Acrylic acid and methacrylic acid are preferred. Suitable nonionic monoethylenically unsaturated monomers for making the hydrophilic core polymer include styrene, .alpha.-methyl styrene, p-methyl styrene, t-butyl styrene, vinyltoluene, ethylene, vinyl acetate, vinyl chloride, vinylidene chloride, (meth)acrylonitrile, (meth)acrylamide, alkyl or alkenyl esters of (meth)acrylic acid, such as methyl(meth)acrylate, ethyl(meth)acrylate, butyl(meth)acrylate, 2-ethylhexyl(meth)acrylate, hydroxyethyl(meth)acrylate, hydroxypropyl(meth)acrylate, benzyl(meth)acrylate, lauryl(meth)acrylate, oleyl(meth)acrylate, palmityl(meth)acrylate, stearyl(meth)acrylate and the like.

The core, whether obtained by a single stage process or a process involving several stages, has an average particle size of from 50 nm to 1.0 micron, preferably from 100 nm to 300 nm, diameter in unswollen condition. If the core is obtained from a preformed or seed polymer, the seed polymer preferably has an average particle size of from 30 nm to 200 nm.

The core may also optionally contain from 0.1 to 20 percent by weight, alternatively from 0.1 to 10 percent by weight, based on the total weight of the core, of multiethylenically unsaturated monomer, wherein the amount used is generally approximately directly proportional to the amount of hydrophilic monoethylenically unsaturated monomer used. Alternatively, the core polymer may contain from 0.1 to 60 percent by weight, based on the total weight of the core polymer, of butadiene.

Suitable multiethylenically unsaturated monomers include alkylene glycol diacrylates and dimethacrylates, such as for example, ethylene glycol di(meth)acrylate; 1,1,1-trimethylol propane di(meth)acrylate; pentaerythritol trimethacrylate; divinyl benzene; vinyl (meth)acrylate; allyl(meth)acrylate, and the like.

The monomers used, as polymerized units, in forming the shell of the multistage polymer, and the relative proportions thereof in the shell should be such that it is permeable to an aqueous or gaseous volatile or fixed basic swelling agent capable of swelling the core. In the event that multiple shells are utilized the composition of the shell is taken herein as the total composition of all of the shells. Styrene is a preferred monomer. In an alternative embodiment the shell further includes, as polymerized units, from 0.1% to 35%, by weight based on the weight of the shell, multiethylenically unsaturated monomer. Suitable multiethylenically unsaturated monomers are those disclosed herein for optional use in the core polymer. The shell may include, as polymerized units, from 0% to 35%, preferably from 0% to 10%, and more preferably from 0.1% to 10% by weight based on the weight of the shell, of one or more monoethylenically unsaturated monomers containing acid-functionality such as those described above for use in the core polymer. (Meth)acrylic acid is preferred. Preferably, the proportion of acid-functional monoethylenically unsaturated monomer in the shell polymer does not exceed one-third the proportion thereof in the core polymer.

The weight ratio of core to an intermediate stage, if present, is typically in the range of from 1:0.5 to 1:10, preferably in the range of from 1:1 to 1:7. The weight ratio of core to shell is typically in the range of from 1:5 to 1:20, preferably in the range of from 1:8 to 1:15.

The amount of shell polymer is typically such as to provide an overall size of the multistage polymer particle of from 70 nm to 4.5 microns, preferably from 100 nm to 3.5 microns, more preferably from 200 nm to 2.0 microns, in unswollen condition (that is, before any neutralization to raise the pH to about 6 or higher) whether the shell polymer is formed in a single stage or in a plurality of stages. When the hydrophilic core polymer is fully encapsulated, it does not titrate with alkali metal bases under analytical conditions of 1 hour and at room temperature. The extent of encapsulation can be determined by removing samples during the course of the shell polymerization and titrating with sodium hydroxide.

The void of the latex polymer particles is preferably produced by swelling the acid-containing core with an aqueous basic swellant that permeates the shell and expands the core. This expansion may involve partial merging of the outer periphery of the core into the pores of the inner periphery of the shell and also partial enlargement or bulging of the shell and the entire particle overall. When the swellant is removed by drying, the shrinkage of the core develops a microvoid, the extent of which depends on the resistance of the shell to restoration to its previous size. Suitable swelling agents for the core include, for example, ammonia, ammonium hydroxide, alkali metal hydroxides (such as sodium hydroxide), and volatile lower aliphatic amines (such as trimethylamine and triethylamine). The swelling step may occur during any of the multistage shell polymerization steps, between any of the staged polymerization steps, or at the end of the multistage polymerization process.

Organic extender particles which contain one or more void when dry, of the type described above, are commercially available, for example, Ropaque™ opaque polymers (Rohm and Haas Co., Philadelphia, Pa.). The amount of such organic extender particles in the composition may be less than 10 parts by dry weight of organic extender particles to 100 parts by dry weight of the alkyd emulsion. The amount may range from at least 1 part, or at least 2 parts, or at least 5 parts, by dry weight of organic extender particles to 100 parts by dry weight of the alkyd emulsion, up to an amount of 5 parts, or up to 8 parts, or up to 9 parts, or up to 10 parts, by dry weight of organic extender particles to 100 parts by dry weight of the alkyd emulsion. In the case of vinyl-alkyd emulsions, such as acrylic-alkyd or styrene-acrylic-alkyd emulsions, the amount of the organic extender particles may range similarly, based on 100 parts by dry weight of the modified alkyd. Likewise, for alkyd emulsion/polymer emulsion blends, in this case based on 100 parts by dry weight of the total binder polymer.

The composition of this invention comprises one or more pigment. In one embodiment, the pigment comprises one or more opacifying pigment or colorant. The opacifying pigment does not include the organic extender particles which contain one or more void, described above. Opacifying pigments include inorganic pigment particles that scatter essentially all wavelengths of visible light without a high degree of absorption. The most commonly used opacifying pigment is titanium dioxide ($TiO_2$), a white pigment. The $TiO_2$ of the present invention may be of any grade, and may include rutile or anatase titanium dioxide. The rutile grade is generally preferred for coatings. Preferably, titanium dioxide particles are orthogonal, i.e., no cross-sectional dimension through a particle is substantially greater than any other cross-sectional dimension through the same particle. Examples of orthogonal particles are spherical and cubic particles, and those having shapes intermediate between spherical and cubic. The titanium dioxide particles can be pretreated with silica, zirconia, aluminum oxide, or mixtures thereof; and may be added to the coating composition as a dry powder or as a slurry in water with other dispersing and/or stabilizing constituents present in the slurry. Fumed $TiO_2$ may also be suitable. Other inorganic opacifying pigments are known in the art and include metal oxides. To the extent that the following are opacifying pigments, one or more of the following may be used in place of, or in conjunction with, titanium dioxide: metal oxides such as, for example, zinc oxide, tin oxide, antimony oxide, zirconium oxide, lead oxide; and zinc sulfide, and lithopone. The amount of opacifying pigment as a percentage of total binder polymer solids is from 0.01% to 200%, by weight, preferably from 1% to 150%, and more preferably from 50% to 150%, or from 50% to 140%, or from 50% to 110%. The most preferred levels may depend on the opacifying pigment. Preferably, the opacifying pigment is titanium dioxide. For white paints, the most preferred level of titanium dioxide is 90% to 140%.

Preferably, the amount of opacifying pigment particles in the composition is less than 140 parts by dry weight of opacifying pigment particles to 100 parts by dry weight of the alkyd emulsion. More preferably, the amount of opacifying pigment particles in the composition is less than 110 parts by dry weight of opacifying pigment particles to 100 parts by dry weight of the alkyd emulsion, or less than 100 parts by dry weight of opacifying pigment particles to 100 parts by dry weight of the alkyd emulsion.

The colorant may include one or more of colored pigments and dyes, and black pigments. The colorant particles include inorganic colorant particles and organic colorant particles. Typically, the colorant particles have average particle diameters in the range of from 10 nanometers (nm) to 50 microns, preferably in the range of 20 nm to 5 microns, and more preferably, in the range of from 40 nm to 2 microns. Soluble dyes may also be used.

Suitable inorganic colorant particles include, but are not limited to, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; and carbon black. One group of preferred inorganic colorant particles is selected from bismuth pigments; mixed metal oxide pigments; chromate and molybdate pigments; ultramarine pigments; cobalt oxide pigments; nickel antimony titanates; lead chrome; blue iron pigments; and carbon black.

Suitable organic colorant particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

For deep tone paints or pastels, the most preferred level of the colorant may be from 0.01% to 20%.

The one or more pigment of the invention may comprise one or more special effects pigment, which may include one or more of, for example, metal effect pigments (such as aluminum, copper, copper oxide, bronze, stainless steel, nickel, zinc, and brass), transparent effect pigments (including pearlescent pigments), luminescent pigments (which exhibit fluorescence and phosphorescence), thermochromic and photochromic pigments. Pearlescent effect pigments are transparent effect pigments which produce pearlescent or iridescent effects, and are based on platelets of low refractive index materials coated with a high refractive index material. Luminescent pigments are materials that emit light (visible, IR or UV) upon suitable excitation, without becoming incandescent. Fluorescence is the visual effect created when a luminescent pigment is emitting light under excitation (eg, daylight fluorescent). Phosphorescence is the visual effect created by the emission of light by a luminescent pigment after excitation has ceased (eg, glow in the dark). Thermochromic pigments are those which alter color upon exposure to heat. Photochromic pigments are those pigments which alter color upon exposure to a UV rich light source.

The composition may optionally also comprise minor quantities of extender (filler) particles other than the organic extender particles which contain one or more void when dry. Extenders are inorganic solids which do not impart the primary color or hiding properties to the coating composition, although they may have secondary influences on those properties. As noted earlier, conventional extenders, such as mineral extenders, are detrimental to the gloss properties of the paint. Preferably, the total amount of such extenders, combined, as a percentage of total binder polymer solids is less than 10%, by weight, or less than 5%, more preferably less than 3%, even more preferably less than 2%. Most preferably there is no mineral extender present in the composition. Examples of extenders include: metal oxides such as aluminum oxide, silicon oxide; calcium carbonate, calcium sulfate, barium sulfate, mica, clay, calcined clay, feldspar, nepheline syenite, wollastonite, diatomaceous earth, magnesium silicate, alumina silicates, talc, and combinations thereof. In one embodiment, the mineral extender particles may have a particle size which is from 10 nm to 50 microns, preferably from 10 nm to 20 microns. In another embodiment, the mineral extender particles may have a particle size which is from 10 to 1000 nm, preferably from 10 to 500 nm.

The composition may optionally include plastic pigments such as solid beads and microspheres not containing voids or vesicles. Examples of such solid beads include polystyrene and polyvinyl chloride beads. Other optional additives include, for example, Expancel™ 551 DE20 acrylonitrile/vinyl chloride expanded particles (Expancel Inc. Duluth Ga.); Sil-Cell™ 35/34 a sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc. Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England); Z-light™ Sphere W-1200 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.).

The aqueous coating composition is prepared by techniques which are well known in the coatings art. First, inorganic pigment(s), such as titanium dioxide, and mineral extenders, if present, are well dispersed in an aqueous medium under high shear, such as is afforded by a COWLES (R) mixer, in forming the "Grind". Then the aqueous alkyd emulsion is added under low shear stirring along with other coatings adjuvants as desired. Alternatively, the grind mixture may be added as a component of the "Let Down" in formulating the paint. In one embodiment, the alkyd of the alkyd emulsion is a vinyl-modified alkyd, such as, for example, an acrylic-modified alkyd, or a styrenated alkyd, or a vinyl-toluenated alkyd. The aqueous dispersion of opaque polymer may be combined with the aqueous alkyd emulsion in an aqueous dispersion. Alternatively, the aqueous alkyd emulsion and the opaque polymer are added separately. The aqueous coating composition may contain, in addition to the alkyd emulsion and opaque polymer, film-forming or non-film-forming waterborne polymers, such as emulsion polymers, in an amount of 0% to 200% by weight of the alkyd emulsion solids. The composition may further contain one or more conventional coatings adjuvants such as, for example, driers, curing agents, extenders, emulsifiers, coalescing agents, co-solvents, plasticizers, naturally derived plasticizers, antifreezes, buffers, neutralizers, thickeners, rheology modifiers, humectants, wetting agents, biocides, plasticizers, antifoaming agents, UV absorbers, fluorescent brighteners, light or heat stabilizers, anti-oxidants, biocides, chelating agents, dispersants, colorants, waxes, and water-repellants. In certain embodiments a photosensitive compound such as, for example, benzophenone or a substituted acetophenone or benzophenone derivative as is taught in U.S. Pat. No. 5,162,415 may be added.

The solids content of the aqueous coating composition may be from 10% to 70% by volume. The viscosity of the aqueous coating composition may be from 50 centipoise to 50,000 centipoise, as measured using a Brookfield viscometer; viscosities appropriate for different application methods vary considerably.

Conventional coatings application methods such as, for example, brushing, rolling, and spraying methods such as, for example, air-atomized spray, air-assisted spray, airless spray, high volume low pressure spray, and air-assisted airless spray may be used to apply the composition of this invention. Additionally, for some systems, other application techniques may be used to apply the composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, paper, paperboard, leather, composites, and cementitious substrates. Drying is typically allowed to proceed under ambient conditions such as, for example, at 0° C. to 35° C. but may be accelerated with higher temperatures, air flow, low humidity, actinic energy such as, for example, e-beam, UV, visible, infrared, or microwave radiation, or sonic energy.

EXPERIMENTAL METHODS

Abbreviations:

OP=Opaque Polymer

TiO2=Titanium Dioxide

Gloss:

A drawdown of the test sample was prepared on an appropriately sized glass panel using a 100μ opening paint applicator. The panel was allowed to dry in a constant temperature/humidity room (25° C.; 50% relative humidity). The 20° and 60° specular gloss was measured using a micro-TRI-gloss meter from BYK Gardner. Gloss was measured after 1 and 7 days of drying.

Contrast Ratio:

A drawdown of the test sample was prepared on a white and black Opacity Chart (Ref. no. AG-5305/2813 BYK Gardner) using a 100μ opening paint applicator. The panel was allowed to dry in the CTR for 7 days. The Y-reflectance of the paint was measured in several areas over both the white and black areas of the opacity chart using a Rhopoint Reflectometer 45% Novoshade. Contrast Ratio (CR) is the ratio of the average reflectance over the black area to the average reflectance of the same paint over the white area.

Paint Formulations, Formulating Procedure:

All aqueous coating compositions in the examples were prepared in the following manner (quantities shown in Table 1):

Grind Procedure:

Water, dispersing agent (Orotan™ 731A ER), and antifoaming agent (Byk-028) were charged to a grind pot. Titanium dioxide pigment (Kronos 2190) was gradually added under agitation using a high speed disperser. The speed of agitation was increased during this addition to maintain a vortex, followed by high speed stirring for 20 minutes to insure good pigment dispersion. At that stage, an assessment of pigment dispersion can be done using a Hegman Gauge.

Let Down Procedure:

The Let Down raw materials were charged to the paint container, with agitation to maintain a vortex.

The pigment volume concentration is calculated by the following formula:

$$PVC\ (\%) = \frac{\text{volume of pigment(s)} + \text{volume extender(s)} \times 100}{\text{total dry volume of paint}}$$

Table 1, below, shows the base formulation for creating the paints described in the examples below. Paints with mineral extender (see, for example, Table 2) utilize Socal® P2 (in the Grind); and alkyd emulsion paints for which the binder is modified with an acrylic emulsion (e.g. see Tables 3 and 4) utilize an acrylic emulsion, Primal™ HG-98 (in the Let Down). The formulations are adjusted accordingly to maintain constant PVC.

TABLE 1

Example of Alkyd Emulsion Paint Formulation with Opaque Polymer

| Material Name | Kilograms | PVC | Supplier |
|---|---|---|---|
| Grind | | | |
| Water | 6.35 | | |
| Orotan ™ 731 A, Dispersant (25%) | 0.89 | | R&H [1] |
| BYK ®-028, Anti-foaming Agent | 0.20 | | BYK [2] |
| Socal ® P2, CaCO3 Mineral Extender | 0.00 | | Solvay [3] |
| Kronos ® 2190, TiO2 Pigment | 22.19 | 16.3% | Kronos [4] |
| Grind Sub-total | 29.63 | | |
| LetDown | | | |
| Uradil ® AZ 554 Z-50, Alkyd Emulsion (50%) | 59.46 | | DSM [5] |
| Primal ™ HG-98, Acrylic Emulsion (45%) | 0.00 | | R&H [1] |
| Ropaque ™ Ultra E, Opaque Polymer (30%) | 4.46 | 6.3% | R&H [1] |
| Acrysol ™ RM-5000, Thickener (18.5%) | 2.67 | | R&H [1] |
| BYK ®-345, Anti-foaming Agent | 0.29 | | BYK [2] |
| Acrysol ™ RM-8W, Thickener (21.5%) | 0.70 | | R&H [1] |
| Water | 0.98 | | |
| Borchers ® Dry 0511 Ca 4 Aqua, Drier | 1.11 | | Borchers [6] |
| Octa-Soligen ® Zirconium 10 Aqua, Drier | 0.50 | | Borchers [6] |
| Octa-Soligen ® Cobalt 7 Aqua, Drier | 0.19 | | Borchers [6] |
| Totals | 100.00 | | |

| Property | Value |
|---|---|
| Total PVC (%) | 22.6 |
| Volume Solids (%) | 44.2 |
| Weight Solids (%) | 53.3 |

[1] Rohm and Haas Company, Philadelphia, PA, USA.
[2] BYK-Chemie GmbH, Wesel, Germany.
[3] Solvay S.A., Brussels, Belgium.
[4] Kronos International, Inc., Leverkusen, Germany.
[5] Royal DSM N.V., Heerlen, the Netherlands.
[6] OMG Borchers GmbH, Langenfeld, Germany Alkyd Emulsions Paint formulators have found that aqueous white paint formulations need to be formulated around 18% TiO2 PVC in order to attain a good level of gloss and acceptable hiding properties (for example, a 20° specular gloss of greater than 70%, and a contrast ratio, CR, of greater than 93%). Furthermore, although gloss properties of aqueous semi-gloss or satin paints may not be adversely affected by the use of mineral extenders, it has been found that gloss properties are severely compromised by addition of mineral extenders in the case of high gloss waterborne paints. This limits both formulation latitude and efforts at cost reduction.

Table 2, below, shows the effect on gloss properties for a series of alkyd emulsion paints formulated with increasing PVC of opaque polymer (and increasing total PVC), and compares it to the analogous case of increasing PVC of a conventional mineral extender of similar particle size (approximately 0.4 microns). The paints in Table 2 are based on the formulation in Table 1. That is, the OP is Ropaque™ Ultra E (the level of which varies according to Table 2), and the mineral extender is Socal® P2 (which likewise varies).

TABLE 2

Effect of Opaque Polymer on Gloss Properties of Alkyd Emulsion Paints

| | Control | Reformulation with Opaque Polymer[1] | | | Reformulation with Mineral Extender[2] | | |
|---|---|---|---|---|---|---|---|
| Formulation No. | 1 | 2 | 3 | 4 | 5 | 6 | 7 |
| TiO2 (% PVC) | 18.1 | 16.3 | 15.4 | 14.5 | 16.3 | 15.4 | 14.5 |
| OP (% PVC) | 0 | 6.3 | 10.8 | 15.0 | | | |
| Extender (% PVC) | | | | | 6.3 | 10.8 | 15.0 |
| Total PVC | 18.1 | 22.6 | 26.2 | 29.5 | 22.6 | 26.2 | 29.5 |
| TiO2 ratio to 100 parts dry binder[3] | 78.3 | 74.3 | 74.0 | 72.9 | 74.6 | 74.0 | 72.9 |
| Dry OP/Extender ratio to 100 parts dry binder[3] | 0 | 4.5 | 8.0 | 11.7 | 20.1 | 36.0 | 52.3 |
| Gloss 1 day (%) | | | | | | | |
| 20° | 89 | 88 | 84 | 79 | 64 | 30 | 12 |
| 60° | 95 | 96 | 96 | 95 | 87 | 70 | 48 |
| Gloss 7 days (%) | | | | | | | |
| 20° | 88 | 86 | 81 | 71 | 47 | 19 | 8 |
| 60° | 95 | 96 | 94 | 92 | 80 | 60 | 38 |
| CR[4] at 100μ (%) | 95.0 | 95.0 | 95.2 | 95.2 | 94.4 | 93.4 | 93.0 |

[1]Ropaque ™ Ultra E, available from Rohm and Haas Company, Philadelphia, PA.
[2]Socal ® P2, available from Solvay S.A., Brussels, Belgium.
[3]Weight ratio based on the weight of dry solids of the components.
[4]CR is the Contrast Ratio (a measure of "hiding"), see above.

The results show that for alkyd emulsion based gloss paint a significant amount of opaque polymer may be added without bringing a significant drop in gloss properties (Formulations 1-3). This is particularly true for the 20° angle measurement (for example, the 7 day specular gloss), which decreases only slightly, from a 20° gloss of 88% (zero OP, Formulation 1) to a 20° gloss of 81% (for 8 parts dry OP in 100 parts dry binder, Formulation 3). The alkyd emulsion paint shows a more significant loss of gloss for additions of opaque polymer greater than 10 parts dry OP in 100 parts dry binder (Formulation 4, with 11.7 parts dry OP in 100 parts dry binder, has a 7 day 20° gloss of 71%). The 20° gloss results obtained for similar additions of a conventional mineral extender of similar particle size (Formulations 5-7), show a much more pronounced decrease in gloss, from a 20° gloss of 88% (zero extender, Formulation 1) to a 20° gloss of 19% (for 8 parts dry extender in 100 parts dry binder, Formulation 6) and a 20° gloss as low as 8% (Formulation 7) for 11.7 parts dry extender in 100 parts dry binder. It can also be seen that the 60° gloss is not affected as much by the addition of mineral extenders, although the trends, described above, are similar.

The data indicate that addition of OP allows removal of some amount of TiO2 from the formulation without loss of "hiding"; i.e. the contrast ratio is essentially unchanged. Replacing some amount of solid TiO2 with a dispersion of OP provides a number of advantages to the formulator including formulation latitude, reduced energy consumption in formulating the grind, as well as cost reduction.

Binder Modification

Alkyd emulsion based paints are often modified with another emulsion binder, for example, using acrylic or styrene-acrylic polymers, in order to provide an optimized balance of properties.

Tables 3 and 4, below, compare the effect on gloss for addition of various levels of either opaque polymer or mineral extender (of similar particle size, ~0.4 microns) in gloss paints based on an alkyd emulsion modified with acrylic emulsion. Table 3 shows the comparison for modification using 10% acrylic emulsion polymer in a 90/10 alkyd emulsion/acrylic emulsion blend; Table 4 shows the same comparison for modification using 30% acrylic emulsion polymer in a 70/30 blend. The formulations are based on that shown in Table 1.

TABLE 3

Effect of Opaque Polymer on Gloss Properties of Binder Modified Alkyd Emulsion Paints: Binder Modified with an Acrylic Emulsion Polymer[1] (10%)

|  | Control | Reformulation with Opaque Polymer[2] | | | Reformulation with Mineral Extender[3] | | |
|---|---|---|---|---|---|---|---|
|  | Formulation No. | | | | | | |
|  | 1 | 2 | 3 | 4 | 5 | 6 | 7 |
| TiO2 (% PVC) | 18.1 | 16.3 | 15.4 | 14.5 | 16.3 | 15.4 | 14.5 |
| OP (% PVC) | 0 | 6.3 | 10.8 | 15.0 |  |  |  |
| Extender (% PVC) |  |  |  |  | 6.3 | 10.8 | 15.0 |
| Total PVC | 18.1 | 22.6 | 26.2 | 29.5 | 22.6 | 26.2 | 29.5 |
| TiO2 ratio to 100 parts dry binder[3] | 78.3 | 74.3 | 74.0 | 72.9 | 74.6 | 74 | 72.9 |
| Dry OP/Extender ratio to 100 parts dry binder[3] | 0 | 4.5 | 8.0 | 11.7 | 20.1 | 36.0 | 52.3 |
| Gloss 1 day (%) | | | | | | | |
| 20° | 83.9 | 80.9 | 76.0 | 69.6 | 25.9 | 10.4 | 4.4 |
| 60° | 92.4 | 92.8 | 92.3 | 90.8 | 65.9 | 44.4 | 25.2 |
| Gloss 7 days (%) | | | | | | | |
| 20° | 83.7 | 80.1 | 75.4 | 68.4 | 23.4 | 9.7 | 4.1 |
| 60° | 92.4 | 92.6 | 92.1 | 90.4 | 63.3 | 42.8 | 23.9 |

[1]The binder is a 90/10 alkyd emulsion/acrylic emulsion blend. The alkyd emulsion is Uradil ® AZ 554 Z-50, and the acrylic emulsion is Primal ™ HG-98.
[2]Ropaque ™ Ultra E, available from Rohm and Haas Company, Philadelphia, PA.
[3]Socal ® P2, available from Solvay S.A., Brussels, Belgium.

TABLE 4

Effect of Opaque Polymer on Gloss Properties of Binder Modified Alkyd Emulsion Paints: Binder Modified with an Acrylic Emulsion Polymer[1] (30%)

|  | Control | Reformulation with Opaque Polymer[2] | | | Reformulation with Mineral Extender[3] | | |
|---|---|---|---|---|---|---|---|
|  | Formulation No. | | | | | | |
|  | 1 | 2 | 3 | 4 | 5 | 6 | 7 |
| TiO2 (% PVC) | 18.1 | 16.3 | 15.4 | 14.5 | 16.3 | 15.4 | 14.5 |
| OP (% PVC) | 0 | 6.3 | 10.8 | 15.0 |  |  |  |
| Extender (% PVC) |  |  |  |  | 6.3 | 10.8 | 15.0 |
| Total PVC | 18.1 | 22.6 | 26.2 | 29.5 | 22.6 | 26.2 | 29.5 |
| TiO2 ratio to 100 parts dry binder[3] | 78.3 | 74.3 | 74.0 | 72.9 | 74.6 | 74 | 72.9 |
| Dry OP/Extender ratio to 100 parts dry binder[3] | 0 | 4.5 | 8 | 11.7 | 20.1 | 36 | 52.3 |
| Gloss 1 day (%) | | | | | | | |
| 20° | 70.7 | 58.8 | 52.7 | 43.5 | 11.5 | 5.6 | 2.7 |
| 60° | 87.3 | 83.9 | 82 | 77.8 | 46.8 | 31.7 | 17.2 |
| Gloss 7 days (%) | | | | | | | |
| 20° | 67.3 | 54.5 | 48.3 | 38.8 | 9.8 | 4.8 | 2.4 |
| 60° | 86.4 | 82.1 | 79.9 | 75 | 43.1 | 28 | 14.9 |

[1]The binder is a 70/30 alkyd emulsion/acrylic emulsion blend. The alkyd emulsion is Uradil ® AZ 554 Z-50, and the acrylic emulsion is Primal ™ HG-98.
[2]Ropaque ™ Ultra E, available from Rohm and Haas Company, Philadelphia, PA.
[3]Socal ® P2, available from Solvay S.A., Brussels, Belgium.

The data show that even in the case of binder modification of an alkyd emulsion based paint the opaque polymer still has a much lower impact on gloss properties than a mineral extender.

Comparative Alkyd Emulsion Systems

Japanese Patent Application Number JP61246264A describes the use of opaque polymer to give hiding in a water-based alkyd emulsion system. The reference does not discuss gloss properties of the coatings disclosed therein. In Table 1 of the reference, pigmented compositions with 40 parts TiO2 to 100 parts of dry binder polymer are compared for systems with, and without, opaque polymer (Embodiment 4 of the reference and Comparative Example 1 of the reference, respectively). Similar systems are compared here in Table 4, below.

TABLE 4

Effect of High Levels of Opaque Polymer on Gloss Properties of Alkyd Emulsion Paints

| Formulation | Comparative Example 1 of the Reference | Embodiment 4 of the Reference |
|---|---|---|
| TiO2 (% PVC) | 10 | 7 |
| OP [1] (% PVC) | 0 | 29 |
| Total PVC | 10 | 36 |
| TiO2 ratio to 100 parts dry binder | 40 | 40 |
| Dry OP ratio to 100 parts dry binder | 0 | 25 |
| Gloss 7 days (%) | | |
| 20° | 88 | 74 |
| 60° | 95 | 98 |
| CR at 100μ (%) | 92 | 93 |

[1] OP is Opaque Polymer E-1742, manufactured by Rohm and Haas Company, Philadelphia, PA, USA.

The pigmented paint with no opaque polymer (Comparative Example 1) is a high gloss paint (20° specular gloss, after 7 days, of 88%). However, the analogous pigmented paint with opaque polymer (Embodiment 4, which is the only disclosed pigmented paint composition with opaque polymer) shows a sharp deterioration in the 20° gloss (20° specular gloss, after 7 days, of 74%).

The Japanese patent application fails to disclose high gloss alkyd emulsion paints comprising TiO2 and opaque polymer, and fails to recognize the benefits of formulation latitude and cost reduction attainable in high gloss paints by replacing TiO2 with small amounts of opaque polymer. This desirable effect is not operable (that is, high gloss properties are lost) at the higher levels of opaque polymer used in the reference, i.e. a ratio of 25 parts dry opaque polymer to 100 parts of dry binder polymer.

What is claimed is:

1. An aqueous paint composition comprising:
   i) one or more alkyd emulsion,
   ii) a dispersion of core-shell organic extender particles, which particles comprise, when dry, one or more void, and
   iii) one or more pigment;
   wherein the amount of organic extender particles in the composition is 1 to 8 parts by dry weight of organic extender particles to 100 parts by dry weight of the alkyd emulsion and wherein that, upon evaporation of the aqueous phase and after 7 days drying at 25° C. and 50% relative humidity, produces a coating on a glass substrate, which coating exhibits a 20° specular gloss of greater than 75%.

2. The aqueous paint composition of claim 1 wherein the pigment comprises one or more opacifying pigment or colorant.

3. The aqueous paint composition of claim 1 wherein the pigment comprises titanium dioxide.

4. The aqueous paint composition of claim 1 wherein the pigment is present in the composition in an amount of 0.01 to 140 parts by dry weight of pigment to 100 parts by dry weight of the alkyd emulsion.

5. The aqueous paint composition of claim 1 wherein the pigment is present in the composition in an amount of 0.01 to 100 parts by dry weight of pigment to 100 parts by dry weight of the alkyd emulsion.

6. The aqueous paint composition of claim 1 that, upon evaporation of the aqueous phase and after 7 days drying at 25° C. and 50% relative humidity, produces a coating on a glass substrate, which coating exhibits a 20° specular gloss of greater than 80%.

7. The aqueous paint composition of claim 1 wherein the alkyd emulsion comprises a vinyl-alkyd.

8. The aqueous paint composition of claim 1 wherein the alkyd emulsion comprises an acrylic-alkyd or styrene-acrylic alkyd.

9. The aqueous paint composition of claim 1, further comprising a waterborne polymer dispersion wherein the polymer is chosen from: an acrylic polymer, a styrene-acrylic polymer, a vinylacetate polymer, a vinylacetate-acrylic, an ethylene-vinylacetate, an ethylene-vinylacetate-vinylchloride, a polyurethane, and a polyamide.

10. The aqueous paint composition of claim 1 wherein the pigment is present in the composition in an amount of 50% to 140% by weight, based on the dry weight of the alkyd emulsion.

11. The aqueous paint composition of claim 1 wherein the pigment is present in the composition in an amount of 50% to 110% by weight, based on the dry weight of the alkyd emulsion.

12. The aqueous paint composition of claim 1 wherein the pigment is titanium dioxide, and wherein a 100 micrometer thick paint film made from the aqueous paint composition has a contrast ratio of greater than or equal to 95%.

13. A method for providing a high gloss paint comprising:
   (a) forming the aqueous paint composition of claim 1;
   (b) applying said aqueous paint composition to a substrate; and
   (c) drying, or allowing to dry, said applied aqueous paint composition.

* * * * *